US012308520B2

(12) United States Patent
Dallal et al.

(10) Patent No.: US 12,308,520 B2
(45) Date of Patent: May 20, 2025

(54) RADIO FREQUENCY BEAMFORMING DEVICE WITH CYLINDRICAL LENS

(71) Applicant: QUALCOMM Incorporated, San Diego, CA (US)

(72) Inventors: Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 17/739,012

(22) Filed: May 6, 2022

(65) Prior Publication Data

US 2023/0361476 A1 Nov. 9, 2023

(51) Int. Cl.

*H01Q 25/00* (2006.01)
*H01Q 3/36* (2006.01)
*H01Q 15/04* (2006.01)
*H01Q 21/10* (2006.01)

(52) U.S. Cl.

CPC ............... *H01Q 15/04* (2013.01); *H01Q 3/36* (2013.01); *H01Q 21/10* (2013.01)

(58) Field of Classification Search

CPC .......... H01Q 15/04; H01Q 3/36; H01Q 21/10; H01Q 21/061; H01Q 21/08; H01Q 1/243; H01Q 25/008; H01Q 19/062

See application file for complete search history.

(56) References Cited

U.S. PATENT DOCUMENTS

| | | | | |
|---|---|---|---|---|
| 2010/0231436 | A1* | 9/2010 | Focke | H01Q 15/08 342/70 |
| 2014/0077995 | A1* | 3/2014 | Artemenko | H01Q 3/24 343/754 |
| 2017/0062944 | A1* | 3/2017 | Zimmerman | H01Q 15/08 |
| 2019/0165482 | A1* | 5/2019 | Shiozaki | H05K 1/181 |
| 2019/0237874 | A1* | 8/2019 | Michaelis | H01Q 1/246 |
| 2022/0216617 | A1* | 7/2022 | Kasani | H01Q 19/10 |
| 2024/0055771 | A1 | 2/2024 | Dallal et al. | |

OTHER PUBLICATIONS

International Search Report and Written Opinion—PCT/US2023/065335—ISA/EPO—Aug. 1, 2023..

* cited by examiner

*Primary Examiner* — Awat M Salih
(74) *Attorney, Agent, or Firm* — Polsinelli

(57) ABSTRACT

Some techniques and apparatuses described herein provide radio frequency (RF) beamforming using a cylindrical lens for implementing phased array beamforming in one direction and lensed beamforming in a second direction. In one example, an apparatus for wireless communication may include a cylindrical lens having a first surface and a second surface opposite to the first surface. In some cases, the cylindrical lens may include a power direction that corresponds to a curvature of the first surface and a non-power direction that is orthogonal to the power direction. In some aspects, the apparatus can include a plurality of linear antenna arrays disposed proximate to the second surface of the cylindrical lens, wherein each linear antenna array of the plurality of linear antenna arrays includes a plurality of antenna array elements.

30 Claims, 12 Drawing Sheets

RADIO FREQUENCY BEAMFORMING DEVICE WITH CYLINDRICAL LENS

FIELD OF THE DISCLOSURE

The present disclosure generally relates to wireless communications. For example, aspects of the present disclosure relate to radio frequency (RF) beamforming devices with a cylindrical lens.

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

In some cases, wireless communications can be performed using high frequency ranges (e.g., sub-terahertz spectrum, terahertz spectrum, etc.). In some examples, devices that communicate using such high frequencies can require additional antennas in order to avoid degraded performance due to path loss that results from the shorter wavelengths. However, configuring additional antennas in a wireless device can result in increased hardware and/or software complexity, increased power consumption, and increased cost.

Systems and techniques described herein provide for radio frequency (RF) beamforming. In some aspects, a beamforming device can be implemented that includes a lens (e.g., a cylindrical lens) and multiple phased antenna arrays. In some examples, the beamforming device can steer an RF beam along a non-power direction of the cylindrical lens by using phased array beamforming. In some cases, the beamforming device can steer an RF beam along a power direction of the cylindrical lens by using array selection beamforming (e.g., selecting an antenna array based on an array position relative to the power direction of the lens). In some aspects, the beamforming device provided herein can operate efficiently at higher frequencies with less antenna elements, reduced complexity, and lower power consumption.

In one illustrative example, a wireless communication apparatus is provided. The wireless communication apparatus includes: a cylindrical lens having a first surface and a second surface opposite to the first surface, the cylindrical lens including a power direction corresponding to a curvature of the first surface and a non-power direction that is orthogonal to the power direction; and a plurality of linear antenna arrays disposed proximate to the second surface of the cylindrical lens, wherein each linear antenna array of the plurality of linear antenna arrays includes a plurality of antenna array elements.

In another example, a method for wireless communications is provided. The method includes: steering a first radio frequency (RF) beam in a first direction using a first linear antenna array from a plurality of linear antenna arrays, wherein the plurality of linear antenna arrays is arranged in a parallel configuration and disposed proximate to a first surface of a cylindrical lens having a curved second surface opposite to the first surface.

In another example, an apparatus for wireless communication is provided that includes at least one memory comprising instructions and at least one processor (e.g., implemented in circuitry) configured to execute the instructions and cause the apparatus to: steer a first radio frequency (RF) beam in a first direction using a first linear antenna array from a plurality of linear antenna arrays, wherein the plurality of linear antenna arrays is arranged in a parallel configuration and disposed proximate to a first surface of a cylindrical lens having a curved second surface opposite to the first surface.

In another example, a non-transitory computer-readable medium is provided for performing wireless communications, which has stored thereon instructions that, when executed by one or more processors, cause the one or more processors to: steer a first radio frequency (RF) beam in a first direction using a first linear antenna array from a plurality of linear antenna arrays, wherein the plurality of linear antenna arrays is arranged in a parallel configuration and disposed proximate to a first surface of a cylindrical lens having a curved second surface opposite to the first surface In another example, an apparatus for wireless communications is provided. The apparatus includes: means for steering a first radio frequency (RF) beam in a first direction using a first linear antenna array from a plurality of linear antenna arrays, wherein the plurality of linear antenna arrays is arranged in a parallel configuration and disposed proximate to a first surface of a cylindrical lens having a curved second surface opposite to the first surface In some aspects, the apparatus is or is part of a user equipment (UE) or a network entity. The network entity may include a base station (e.g., a 3GPP gNodeB (gNB) for 5G/NR, a 3GPP eNodeB (eNB) for LTE, a Wi-Fi access point (AP), or other base station) or a portion of a base station having a disaggregated architecture (e.g., a central unit (CU), a distributed unit (DU), a radio unit (RU), a Near-Real Time (Near-RT) RAN Intelligent Controller (RIC), or a Non-Real Time (Non-RT) RIC of a gNB or other base station). In some aspects, the apparatus includes a transceiver or multiple transceivers configured to transmit and/or receive radio frequency (RF) signals. In some aspects, the at least one processor includes one or more neural processing units (NPUs), one or more central processing units (CPUs), one or more graphics processing units (GPUs), any combination thereof, and/or other processing device(s) or component(s).

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
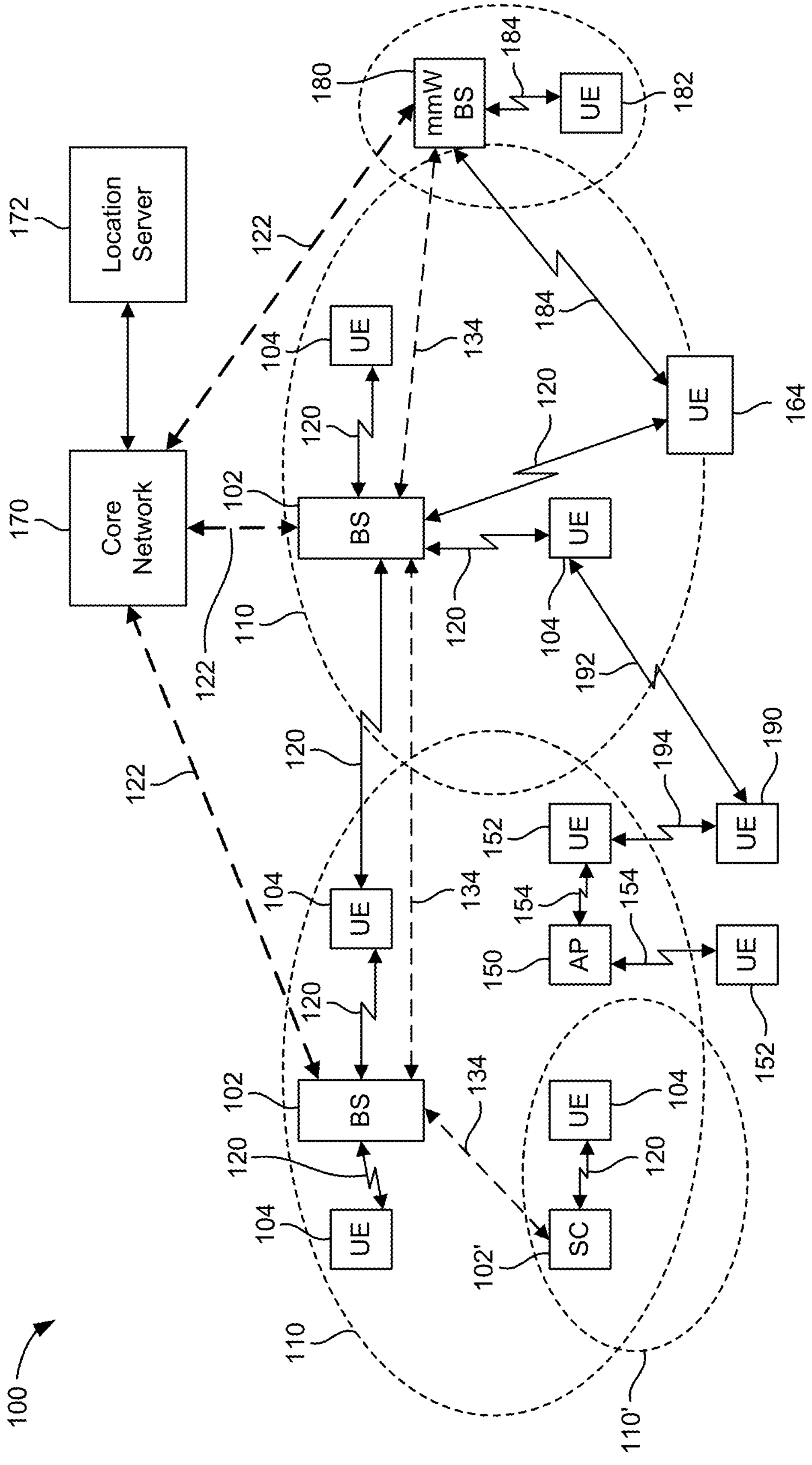
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit (CU), a distributed unit (DU), a radio unit (RU), etc.). In one example, an access link between a UE and a 3GPP gNB can be over a Uu interface. In some cases, an access link may support uplink signaling, downlink signaling, connection procedures, etc.

In some examples, a gNB and UE may be configured to operate using a higher frequency range. For instance, the sub-terahertz frequency spectrum can range between 90 gigahertz (GHz) and 300 GHz. In such a frequency range, the wavelength can be as small as 1 millimeter (mm). Consequently, operation using higher frequencies may result in degraded performance due to higher path loss. In some cases, additional antennas or antenna arrays may be added to a device (e.g., a UE) to improve performance at higher frequencies. For example, the number of antenna elements can be increased in proportion with the square of the frequency. However, increasing the number of antenna elements can be undesirable due to factors such as added cost, increased complexity, and a larger footprint (e.g., consumes more space on a printed circuit board and/or within a device).

Systems, apparatuses, processes (also referred to as methods), and computer-readable media (collectively referred to as “systems and techniques”) are described herein for radio frequency (RF) beamforming. In some aspects, a hybrid beamforming device can be implemented that includes a lens (e.g., a cylindrical lens) and multiple phased antenna arrays. In some examples, the beamforming device can steer an RF beam along an elevation direction (e.g., non-power direction of the cylindrical lens) by using phase array action (e.g., phased array beamforming). In some cases, the beamforming device can steer an RF beam along an azimuthal direction (e.g., power direction) by selecting an antenna array (e.g., array selection beamforming based on array position relative to the power direction of the lens).

In some aspects, the beamforming device can include a cylindrical lens that has a planar surface and a curved (or convex) surface that is opposite the planar surface. In some examples, the power direction of the cylindrical lens can correspond to a curvature of the curved surface and the non-power direction can be orthogonal to the power direction. In some cases, the linear antenna arrays can be positioned or arranged behind the planar surface of the cylindrical lens in a direction that is perpendicular to the power direction. In some aspects, the UE may select one of the linear antenna arrays to direct an RF beam along the power direction of the cylindrical lens. In some examples, the UE may perform phased array beamforming to direct an RF beam along the non-power direction of the cylindrical lens.

In some aspects, the systems and techniques can provide a beamforming device that can have a reduced complexity (e.g., less hardware/software complexity) and consume less power than a device that includes a rectangular antenna array. In some examples, the beamforming device can be used to concurrently steer multiple RF beams in different directions.

Various aspects of the systems and techniques described herein will be discussed below with respect to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an example of a wireless communications system 100. The wireless communications system 100 (which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters.

The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
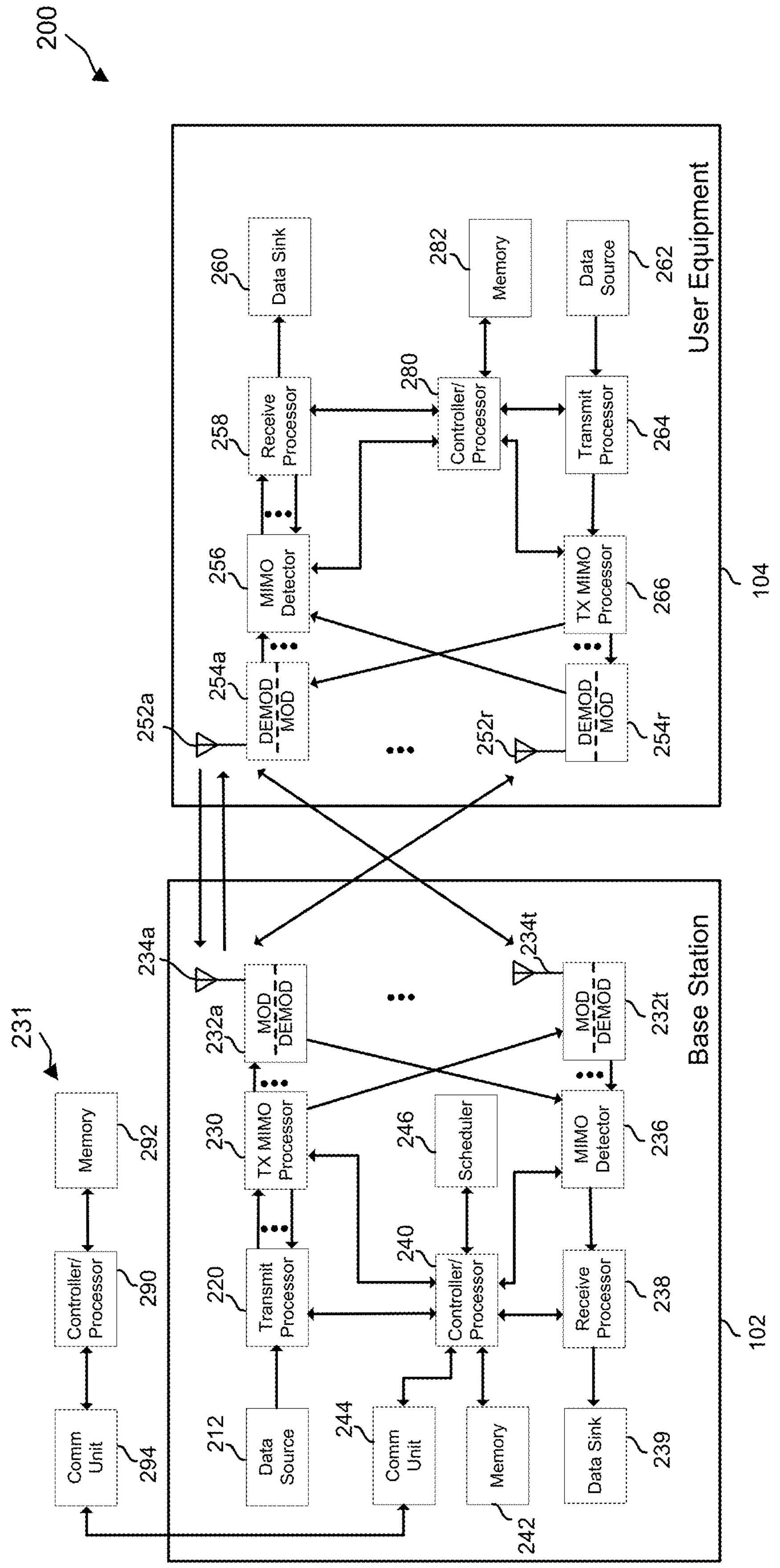
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234*a* through 234*t*, and UE 104 may be equipped with R antennas 252*a* through 252*r*, where in general $T \geq 1$ and $R \geq 1$.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
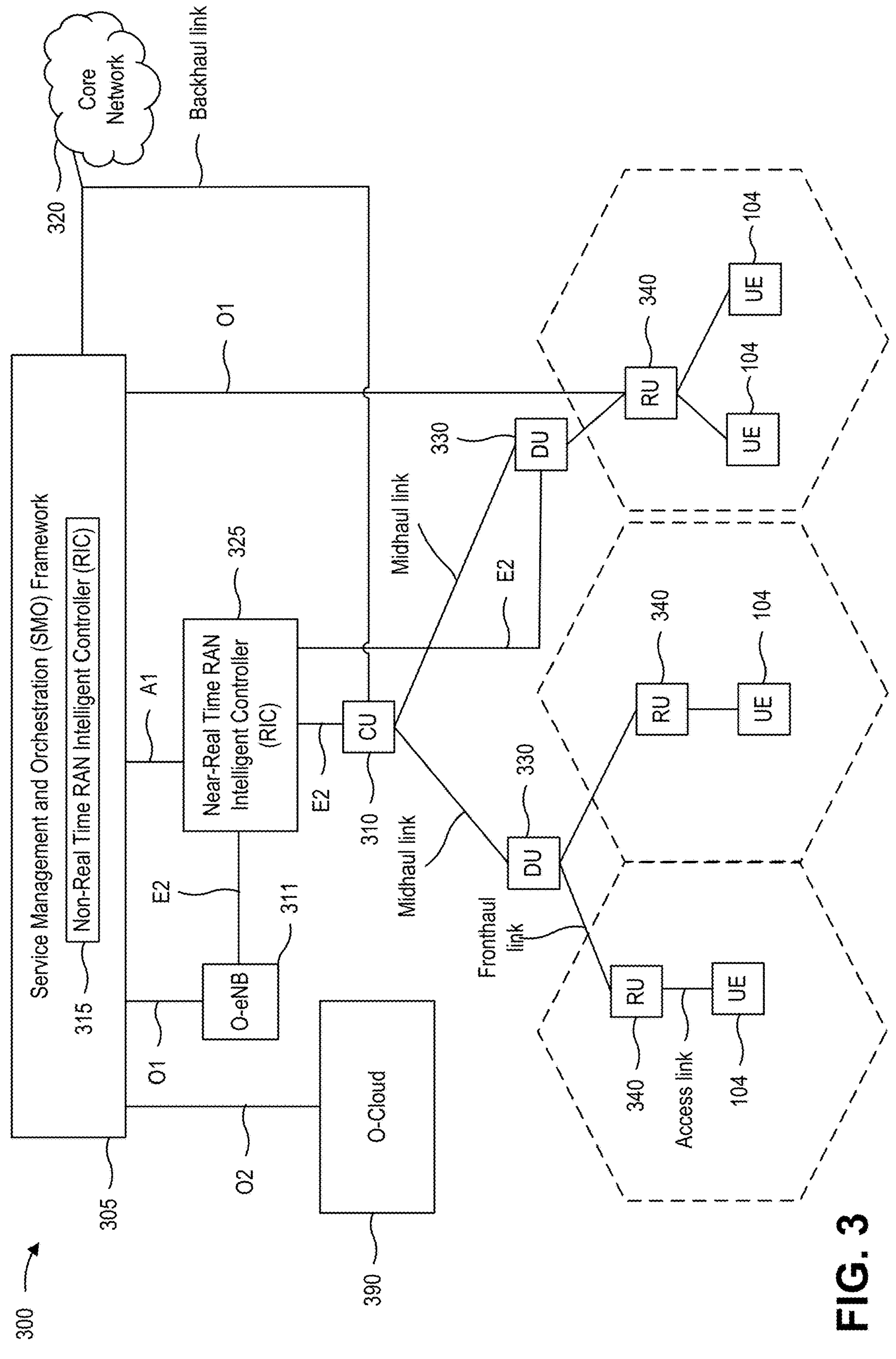
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Figure 4:
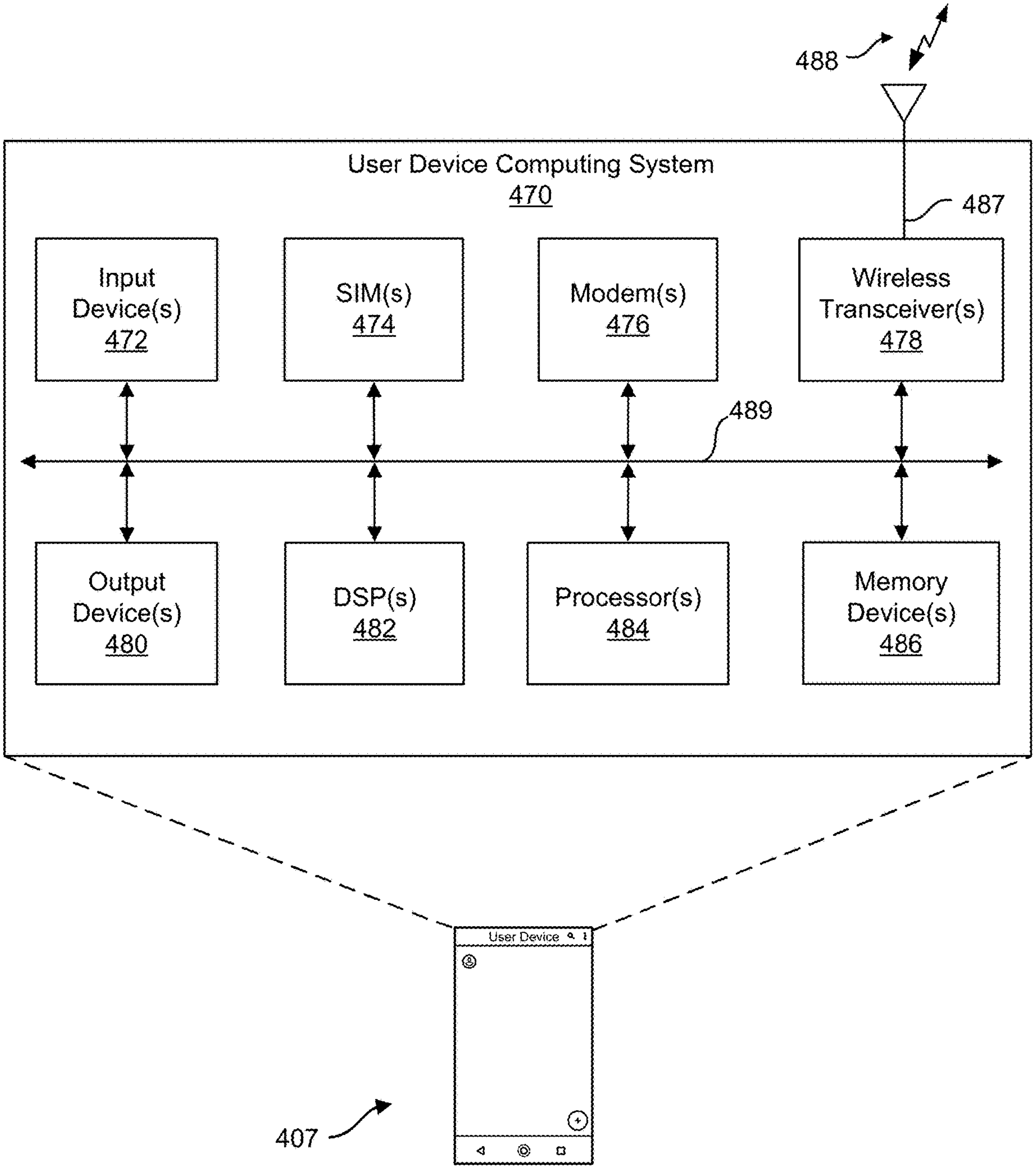
FIG. 4 is a block diagram illustrating components of a user equipment, in accordance with some examples.

FIG. 4 illustrates an example of a computing system 470 of a wireless device 407. The wireless device 407 can include a client device such as a UE (e.g., UE 104, UE 152, UE 190) or other type of device (e.g., a station (STA) configured to communication using a Wi-Fi interface) that can be used by an end-user. For example, the wireless device 407 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that can be electrically or communicatively coupled via a bus 489 (or may otherwise be in communication, as appropriate). For example, the computing system 470 includes one or more processors 484. The one or more processors 484 can include one or more CPUs, ASICs, FPGAs, APs, GPUs, VPUs, NSPs, microcontrollers, dedicated hardware, any combination thereof, and/or other processing device or system. The bus 489 can be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 can include one or more radio frequency (RF) interfaces configured to transmit and/or receive RF signals. In some examples, an RF interface can include components such as modem(s) 476, wireless transceiver(s) 478, and/or antennas 487. The one or more wireless transceivers 478 can transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 can include multiple antennas or an antenna array that can facilitate simultaneous transmit and receive functionality. Antenna 487 can be an omnidirectional antenna such that radio frequency (RF) signals can be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 can be configured to transmit RF signals for performing sidelink communications via antenna 487 in accordance with one or more transmit power parameters that can be associated with one or more regulation modes. Wireless transceivers 478 can also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 488 into a baseband or intermediate frequency and can convert the RF signals to the digital domain.

In some cases, the computing system 470 can include a coding-decoding device (or CODEC) configured to encode and/or decode data transmitted and/or received using the one or more wireless transceivers 478. In some cases, the computing system 470 can include an encryption-decryption device or component configured to encrypt and/or decrypt data (e.g., according to the AES and/or DES standard) transmitted and/or received by the one or more wireless transceivers 478.

The one or more SIMs 474 can each securely store an international mobile subscriber identity (IMSI) number and related key assigned to the user of the wireless device 407. The IMSI and key can be used to identify and authenticate the subscriber when accessing a network provided by a network service provider or operator associated with the one or more SIMs 474. The one or more modems 476 can modulate one or more signals to encode information for transmission using the one or more wireless transceivers 478. The one or more modems 476 can also demodulate signals received by the one or more wireless transceivers 478 in order to decode the transmitted information. In some examples, the one or more modems 476 can include a Wi-Fi modem, a 4G (or LTE) modem, a 5G (or NR) modem, and/or other types of modems. The one or more modems 476 and the one or more wireless transceivers 478 can be used for communicating data for the one or more SIMs 474.

The computing system 470 can also include (and/or be in communication with) one or more non-transitory machine-readable storage media or storage devices (e.g., one or more memory devices 486), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 can also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

As noted above, systems and techniques are described herein for radio frequency (RF) beamforming. In some cases, the systems and techniques can be implemented by a user equipment (UE) such as UE 104. In some aspects, the systems and techniques can be used to perform hybrid beamforming in which the direction of an RF beam is based on the linear antenna array selected for beamforming (e.g., array selection beamforming) and/or the phasing of the antenna elements within the selected linear antenna array (e.g., phased array beamforming). In some aspects, array selection beamforming can be used to steer an RF beam along the power direction of a cylindrical lens. In some examples, phased array beamforming can used to steer an RF beam along a non-power direction of a cylindrical lens that is orthogonal to the power direction of the cylindrical lens.

Figure 5:
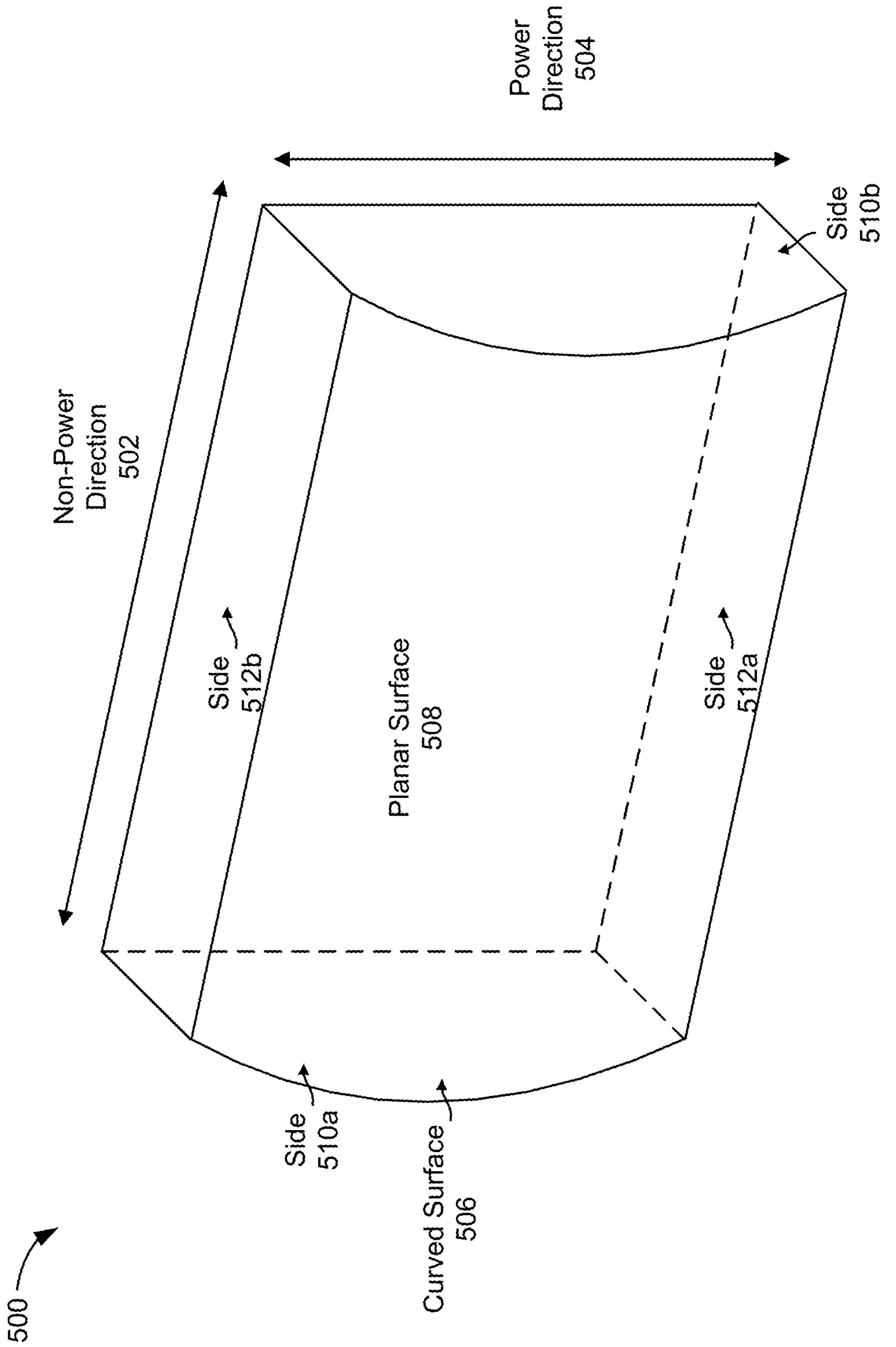
FIG. 5 is a diagram illustrating an example of a cylindrical lens for use with a beamforming device, in accordance with some examples.

FIG. 5 illustrates an example of cylindrical lens 500 for use with a beamforming device. In some aspects, cylindrical lens 500 can include a curved surface 506 that may be used to converge or diverge radio frequency (RF) beams. As illustrated, curved surface 506 corresponds to a convex surface that may converge RF beams. In some examples, cylindrical lens can have a planar surface 508 that is opposite the curved surface 506. In some cases, the planar surface 508 may be a flat surface, without any curvature. In some aspects, cylindrical lens 500 can have a power direction 504 that corresponds to a curvature of curved surface 506. In some cases, cylindrical lens 500 can have a non-power direction 502 that is orthogonal to the power direction 504 (e.g., the non-power direction 502 runs along the length of the lens without optical power).

In some examples, cylindrical lens 500 may have side 510*a* and side 510*b* that are opposite to each other and run alongside the curvature of curved surface 506 (e.g., side 510*a* and side 510*b* are parallel to power direction 504). In some cases, cylindrical lens 500 may have side 512*a* and side 512*b* that are opposite to each other and are parallel to the non-power direction 502. Although cylindrical lens 500 is illustrated having a rectangular form factor, those skilled in the art will recognize that additional form factors (e.g., square, circular, elliptical, etc.) may be used in accordance with the present technology.

Figure 6:
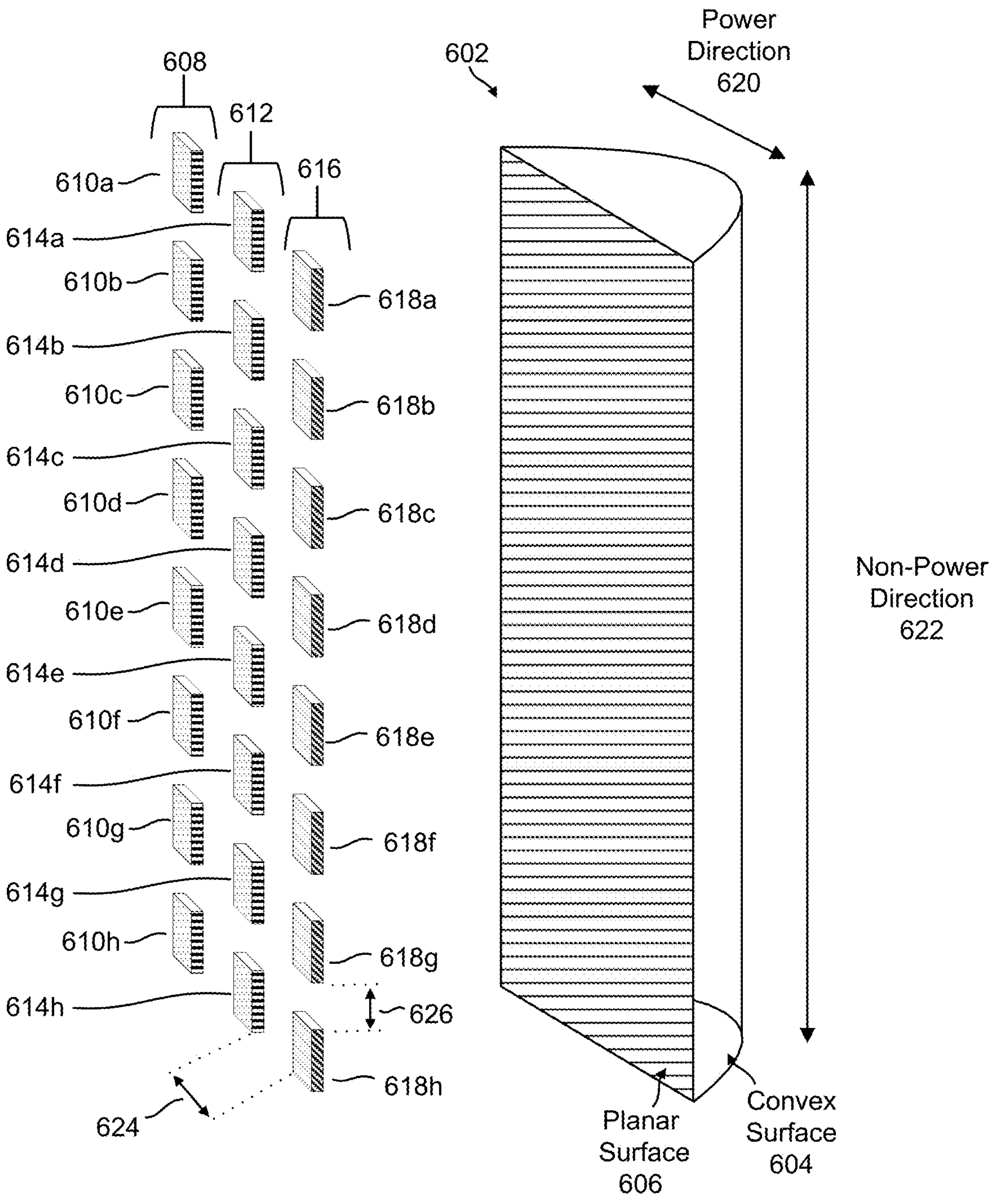
FIG. 6 is a diagram illustrating portions of a beamforming device with a cylindrical lens, in accordance with some examples.

FIG. 6 is a diagram illustrating portions of a beamforming device with a cylindrical lens, in accordance with some examples. In some aspects, the beamforming device may include cylindrical lens 602. In some examples, cylindrical lens 602 may correspond to a plano convex lens, a biconvex lens, a convex meniscus lens, a biconcave lens, a plano concave lens, a concave meniscus lens, and/or any other type of cylindrical lens. As illustrated, cylindrical lens 602 corresponds to a plano convex lens such as cylindrical lens 500 illustrated in FIG. 5.

In some cases, cylindrical lens 602 can have a first surface and a second surface opposite to the first surface. In some examples, the first surface can correspond to a planar surface and the second surface can correspond to a convex surface. For example, cylindrical lens 602 can include convex surface 604 (e.g., first surface) that is opposite to planar surface 606 (e.g., second surface). In some aspects, cylindrical lens 602 can include a power direction 620 corresponding to a curvature of the first surface (e.g., curvature of convex surface 604). In some examples, cylindrical lens 602 can have optical power in power direction 620. In some aspects, power direction 620 may be orthogonal to non-power direction 622.

In some instances, the beamforming device may include a plurality of linear antenna arrays disposed proximate to the second surface of the cylindrical lens. For example, linear antenna array 608, linear antenna array 612, and linear antenna array 616 may be disposed (e.g., placed, arranged, etc.) proximate to planar surface 606. In some examples, the distance between the linear antenna arrays (e.g., linear antenna array 608, linear antenna array 612, and linear antenna array 616) and planar surface 606 may correspond to a back focal length of cylindrical lens 602. In one non-limiting example, the distance between the linear antenna arrays and planar surface 606 may be approximately 7 millimeters (mm). In some aspects, the linear antenna arrays can be positioned such that a radio frequency (RF) beam is collimated along power direction 620 (e.g., perpendicular to a direction of the linear antenna arrays).

In some cases, each linear antenna array of the plurality of linear antenna arrays can include a plurality of antenna array elements. For instance, linear antenna array 608, linear antenna array 612, and linear antenna array 616 can each include multiple antenna elements. In some examples, linear antenna array 608 can include antenna element 610*a*, antenna element 610*b*, antenna element 610*c*, antenna element 610*d*, antenna element 610*e*, antenna element 610*f*, antenna element 610*g*, and antenna element 610*h* (collectively referred to as "antenna elements 610"). In some cases, linear antenna array 612 can include antenna element 614*a*, antenna element 614*b*, antenna element 614*c*, antenna element 614*d*, antenna element 614*e*, antenna element 614*f*, antenna element 614*g*, and antenna element 614*h* (collectively referred to as "antenna elements 614"). In some configurations, linear antenna array 616 can include antenna element 618*a*, antenna element 618*b*, antenna element 618*c*, antenna element 618*d*, antenna element 618*e*, antenna element 618*f*, antenna element 618*g*, and antenna element 618*h* (collectively referred to as "antenna elements 618"). Although FIG. 6 is illustrated as having three linear antenna arrays with eight antenna elements, those skilled in the art will recognize that the present technology is not limited to a particular number of linear antenna arrays and/or a particular number of antenna elements.

In some examples, the plurality of antenna array elements for each of the plurality of linear antenna arrays can be aligned in a direction that is perpendicular to the power direction. For example, antenna elements 610*a-h*, antenna elements 614*a-h*, and antenna elements 618*a-h* can each be aligned in a direction that is perpendicular to power direction 620 (e.g., parallel to non-power direction 622). In some aspects, each linear antenna array (e.g., linear antenna array 608, linear antenna array 612, and linear antenna array 616) can be configured to steer an RF beam along different portions of power direction 620. For example, linear antenna array 612 can be used to steer an RF beam along the center of power direction 620. In another example, linear antenna array 608 and linear antenna array 616 can be used to steer RF beams at different angles along power direction 620 (e.g., as further illustrated and described herein with respect to FIG. 8).

In some cases, each linear antenna array (e.g., linear antenna array 608, linear antenna array 612, and linear antenna array 616) can be used to steer an RF beam along different portions of non-power direction 622. For example, each of the linear antenna arrays can be configured as a phased array antenna in which each of the corresponding antenna elements are configured to transmit or receive a phase shifted RF signal. In one illustrative example, a phase difference between each of the antenna elements 614 corresponding to linear antenna array 612 can be used to steer an RF beam (e.g., radiation pattern) in different directions along the non-power direction 622. In some aspects, phasing of antenna elements 614 can steer the RF beam at different angles relative to the non-power direction 622 while maintaining the RF beam at the center of the power direction 620 based on the position of linear antenna array 612.

In some examples, the distance 624 between one or more linear antenna arrays can be less than or equal to a wavelength of an RF signal. For example, an RF signal having a frequency of 150 GHz can have a wavelength that is approximately 2 millimeters (mm). In one illustrative example, distance 624 between linear antenna array 612 and linear antenna array 616 can be approximately 1.75 mm. In some cases, array pitch 626 (e.g., distance between antenna elements) can be approximately half of the wavelength of an RF signal. For instance, array pitch 626 can be approximately 1 mm when the wavelength is 2 mm.

Figure 7:
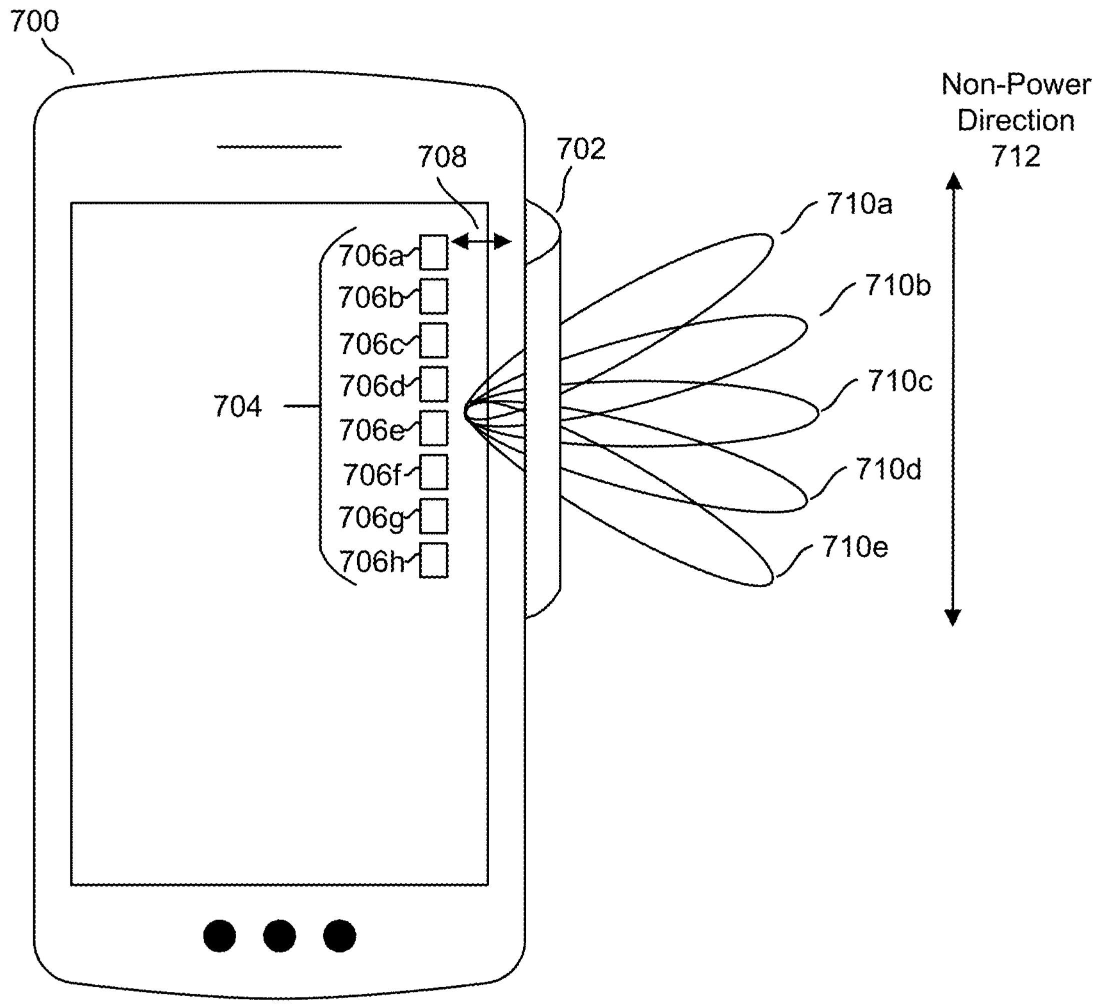
FIG. 7 is a diagram illustrating an example of a user equipment (UE) having a beamforming device with a cylindrical lens, in accordance with some examples.

FIG. 7 illustrates a frontal view of a user equipment (UE) 700 that includes a beamforming device with a cylindrical lens. In some aspects, UE 700 can include a cylindrical lens 702. In some cases, the cylindrical lens 702 may correspond to a plano convex lens such as cylindrical lens 500 illustrated in FIG. 5. In some examples, cylindrical lens 702 may be mounted along a side or edge of UE 700. In some cases, cylindrical lens 702 can be mounted on UE 700 such that cylindrical lens 702 is flush with or level to a side or edge of UE 700. In another example, cylindrical lens 702 can be mounted on UE 700 such that cylindrical lens 702 is recessed relative to a side or edge of UE 700. In another example, cylindrical lens 702 can be mounted on UE 700 such that cylindrical lens 702 protrudes from UE 700. In some cases, the width of cylindrical lens 702 can be less than or equal to a thickness of UE 700.

In some aspects, UE 700 can include one or more linear antenna arrays such as linear antenna array 704. In some cases, UE 700 can include additional linear antenna arrays (not illustrated) that can be arranged in a direction that is substantially parallel to linear antenna array 704. In some examples, linear antenna array 704 can include multiple antenna array elements such as antenna element 706*a*, antenna element 706*b*, antenna element 706*c*, antenna element 706*d*, antenna element 706*e*, antenna element 706*f*, antenna element 706*g*, and antenna element 706*h* (collectively referred to as "antenna elements 706").

In some examples, antenna elements 706*a-h* can be positioned behind cylindrical lens 702. For example, antenna elements 706*a-h* can be arranged behind a planar surface (e.g., planar surface 508) of cylindrical lens 702. In some cases, the distance 708 between antenna elements 706*a-h* and cylindrical lens 702 can be based on a back focal length of cylindrical lens 702.

In some aspects, each linear antenna array can be configured to steer at least on RF beam along the non-power direction of the cylindrical lens. For example, linear antenna array 704 can be configured to steer one or more RF beams (e.g., RF beam 710*a*, RF beam 710*b*, RF beam 710*c*, RF beam 710*c*, RF beam 710*d*, and/or RF beam 710*e*) along non-power direction 712 of cylindrical lens 702. In some examples, linear antenna array 704 can be configured as a phased antenna array such that antenna elements 706*a-h* are configured to transmit or receive a phase shifted RF signal. In one illustrative example, a phase difference between each of the antenna elements 706*a-h* corresponding to linear antenna array 704 can be used to steer RF beam 710*c* in a direction that is perpendicular to linear antenna array 704 (e.g., at the center of non-power direction 712). In another example, phase differences between each of the antenna elements 706*a-h* corresponding to linear antenna array 704 can be used to steer an RF beam in one or more directions along the non-power direction 712 (e.g., directions corresponding to RF beam 710*a*, RF beam 710*b*, RF beam 710*d*, and/or RF beam 710*e*).

Figure 8:
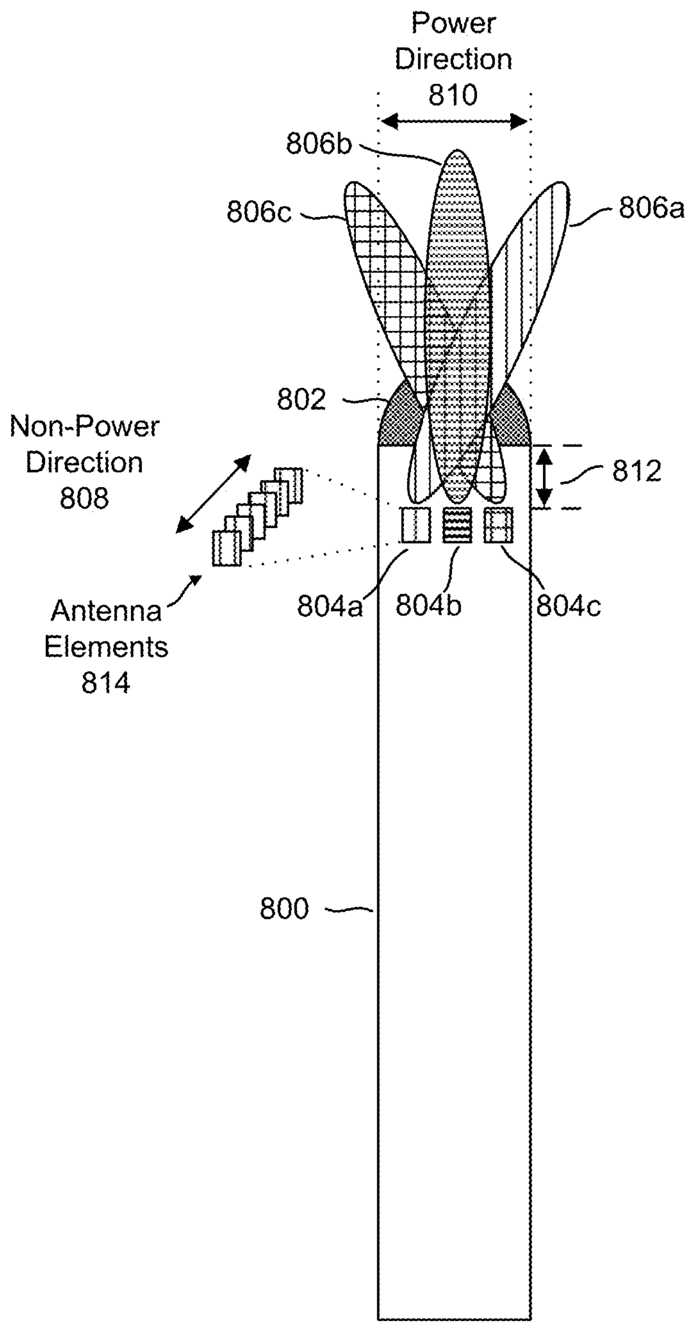
FIG. 8 is a diagram illustrating another example of a UE having a beamforming device with a cylindrical lens, in accordance with some examples.

FIG. 8 illustrates a side view of a user equipment (UE) 800 that includes a beamforming device with a cylindrical lens. In some aspects, UE 800 can include a cylindrical lens 802. In some cases, the cylindrical lens 802 may correspond to a plano convex lens such as cylindrical lens 500 illustrated in FIG. 5. As illustrated, cylindrical lens 802 is mounted along a top surface of UE 800. However, those skilled in the art will recognize that cylindrical lens 802 can be positioned at any other suitable location relative to UE 800 for transmitting and receiving RF signals (e.g., bottom, side, front, back, etc.).

In some aspects, UE 800 can include one or more linear antenna arrays such as linear antenna array 804*a*, linear antenna array 804*b*, and linear antenna array 804*c*. In some examples, each linear antenna array can include multiple antenna elements. For instance, linear antenna array 804*a* can include antenna elements 814. In some aspects, linear antenna array 804*b* and linear antenna array 804*c* may also include a series of antenna elements (not illustrated) that can be arranged in a direction that is substantially parallel to antenna elements 814. In some configurations, each linear antenna array may steer an RF beam along non-power direction 808 using phase shifting among the respective antenna elements (e.g., antenna elements 814).

In some examples, an RF beam can be steered along power direction 810 of cylindrical lens 802 based on the selection of a linear antenna array. For example, selection of linear antenna array 804*a* can be used to steer an RF beam in a direction along power direction 810 corresponding to RF beam 806*a*. In another example, selection of linear antenna array 804*b* can be used to steer an RF beam in a direction along power direction 810 corresponding to RF beam 806*b*. In another example, selection of linear antenna array 804*c* can be used to steer an RF beam in a direction along power direction 810 corresponding to RF beam 806*c*.

In some cases, each linear antenna array can be associated with a corresponding beam angle that is based on a position of each linear antenna array relative to a surface of the cylindrical lens. For example, each linear antenna array can be configured to direct an RF beam along power direction 810 based on the position of the linear antenna array relative to a surface (e.g., planar surface 508 or curved surface 506) of cylindrical lens 802. In one illustrative example, linear antenna array 804*b* can be positioned behind the center of cylindrical lens 802 and can be configured to direct RF beam 806*b* at a 90 degree angle that can coincide with a center of power direction 810.

In some examples, the distance 812 between the linear antenna arrays (e.g., linear antenna array 804*a*, linear antenna array 804*b*, and linear antenna array 804*c*) and the cylindrical lens 802 can be based on a back focal length of cylindrical lens 802. In some cases, the linear antenna arrays can be positioned such that the respective RF beam (e.g., RF beam 806*a*, RF beam 806*b*, and RF beam 806*c*) is collimated along power direction 810 of cylindrical lens 802.

Figure 9:
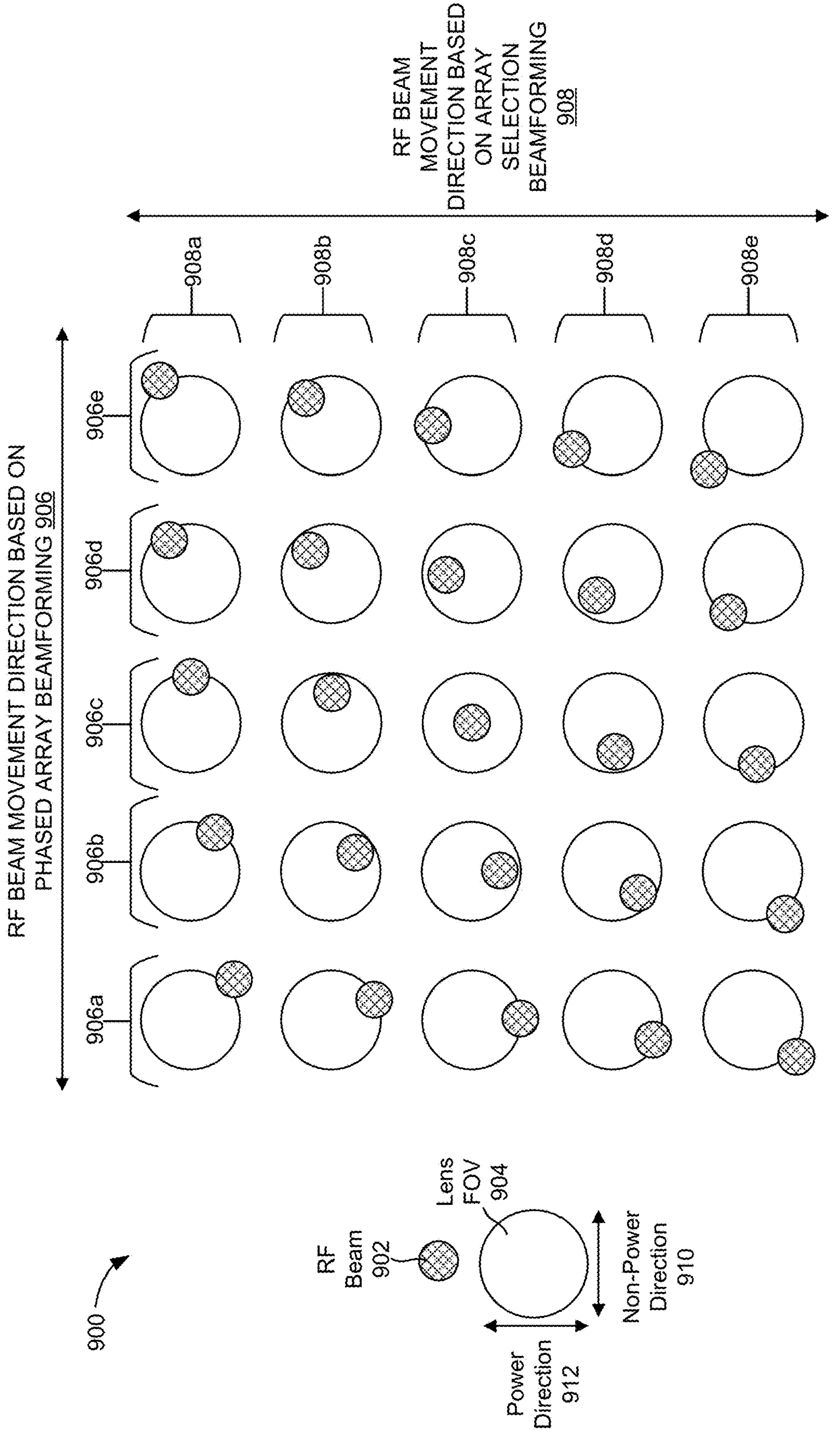
FIG. 9 is a diagram illustrating examples of beam steering directions, in accordance with some examples.

FIG. 9 is a diagram illustrating examples of beam steering directions 900 for RF beam 902 relative to lens field of view (FOV) 904. As noted above, a phased linear antenna array can be used to steer an RF beam along a non-power direction 910 of a cylindrical lens and selection of a linear antenna array can be used to steer an RF beam along the power direction 912 of a cylindrical lens. In some aspects, the overall direction of an RF beam can be based the linear antenna array selected for beamforming (e.g., array selection beamforming) and the phasing of the antenna elements within the selected linear antenna array (e.g., phased array beamforming).

For example, as illustrated in FIG. 9, movement of the RF beam 902 in a direction 908 corresponding to the power direction 912 (e.g., movement of the RF beam 902 from (906*a*, 908*a*) to (906*b*, 908*a*)) can be based on the selection of a different linear array using array selection beamforming. For instance, selection of a different antenna array can shift the RF beam 902 in the direction 908.

Similarly, movement of the RF beam 902 in a direction 906 corresponding to the non-power direction 910 (e.g., movement of the RF beam 902 from (906*a*, 908*a*) to (906*a*, 908*b*)) can be based on phased array beamforming (e.g., using a same antenna array with different antenna phasing). For example, phased array beamforming can shift the RF beam 902 in the direction 906.

In one example, the direction of RF beam 902 can be located substantially at the center of lens FOV 904 when array selection beamforming corresponds to linear antenna array 906*c* and phased array beamforming corresponds to antenna phasing 908*c*. In another example, the direction of RF beam 902 can be steered away from the center of lens FOV 904 downward along power direction 912 by maintaining antenna phasing 908*c* and selecting linear antenna array 906*b* or linear antenna array 906*a*. In another example, the direction of RF beam 902 can be steered away from the center of lens FOV 904 toward the right along the non-power direction 910 by continuing to use linear antenna array 906*c* while using antenna phasing 908*b* or antenna phasing 908*a*. Similar operations can be performed when using linear antenna array 906*d* or linear antenna array 906*e*.

Figure 10:
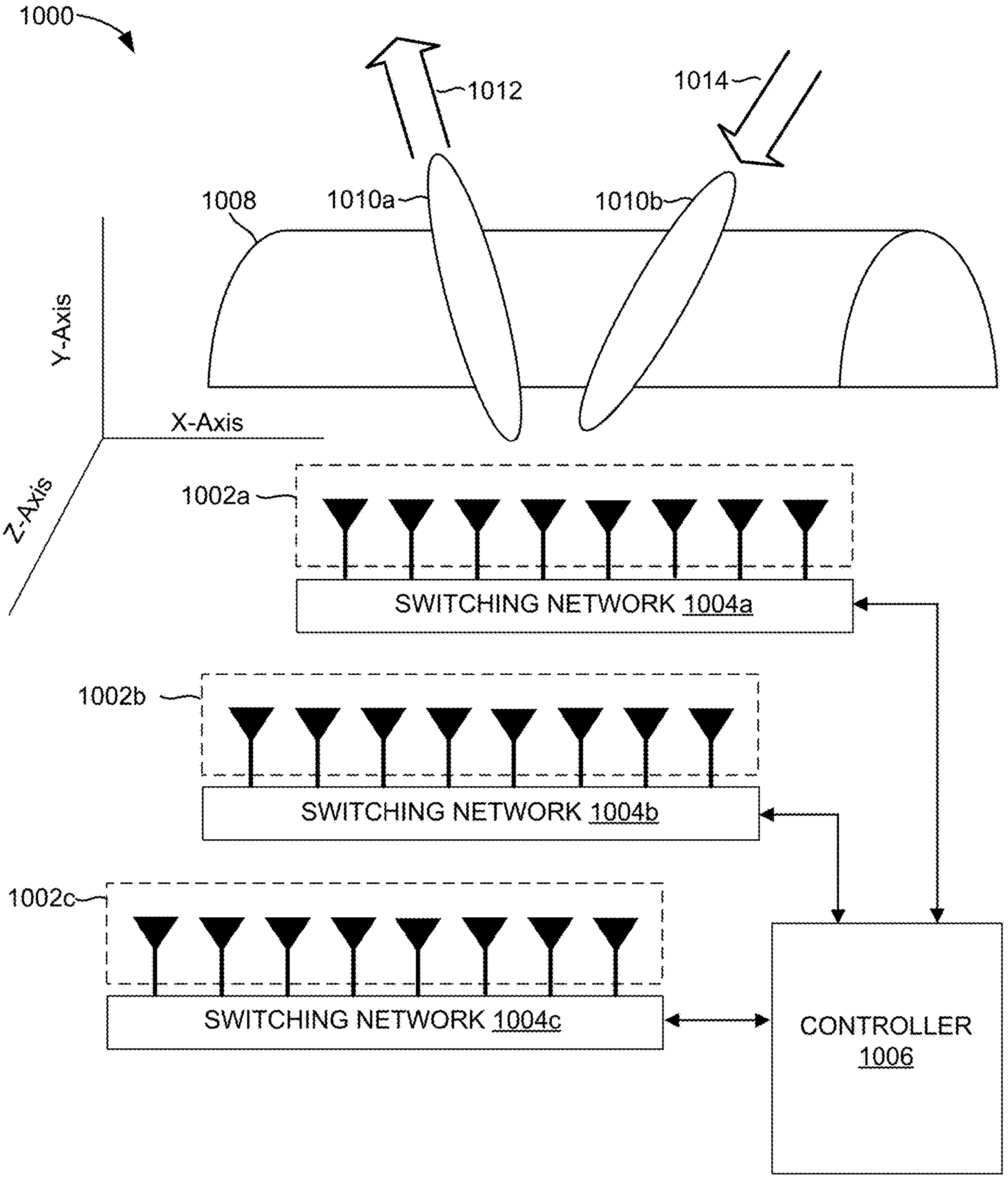
FIG. 10 is a diagram illustrating further portions of a beamforming device with a cylindrical lens, in accordance with some examples.

FIG. 10 is a diagram illustrating portions of a beamforming device 1000 with a cylindrical lens, in accordance with some examples. In some aspects, beamforming device 1000 can include one or more linear antenna arrays such as linear antenna array 1002*a*, linear antenna array 1002*b*, and linear antenna array 1002*c*. In some cases, each linear antenna array can be positioned to direct a respective RF beam along a different angle corresponding to a power direction of cylindrical lens 1008. In some examples, each linear antenna array can include multiple antenna elements that can be configured to perform phased array beamforming in order to direct an RF beam along a non-power direction of cylindrical lens 1008. For example, linear antenna array 1002*a*, linear antenna array 1002*b*, and/or linear antenna array 1002*c* may be configured to direct RF beam 1010*a* through cylindrical lens 1008 to transmit output signal 1012. In another example, linear antenna array 1002*a*, linear antenna array 1002*b*, and/or linear antenna array 1002*c* can be configured to direct RF beam 1010*b* through cylindrical lens 1008 to receive input signal 1014.

In some aspects, each linear antenna array can be coupled to a respective switching network that can be used by controller 1006 to independently address and/or control each linear antenna array. For example, linear antenna array 1002*a* can be coupled to switching network 1004*a*, linear antenna array 1002*b* can be coupled to switching network 1004*b*, and linear antenna array 1002*c* can be coupled to switching network 1004*c*.

In some configurations, each switching network provides a connection to controller 1006 for each respective linear antenna array. In some examples, controller 1006 can separately address and control each linear antenna array (e.g., via a respective switching network). In some aspects, controller 1006 may configure each linear antenna array to independently stream data (e.g., transmit or receive an RF signal) and/or to independently direct an RF beam to a particular direction. For example, controller 1006 can configure linear antenna array 1002*a* to direct an RF beam in a first direction and simultaneously configure linear antenna array 1002*b* to direct an RF beam in a second direction that is different from the first direction. In some cases, controller 1006 may configure multiple linear antenna arrays to direct beams in a same direction. For instance, linear antenna array 1002*b* and linear antenna array 1002*c* may both be configured to receive input signal 1014 using RF beam 1010*b*. In some aspects, the controller 1006 can control two or more arrays (e.g., linear antenna array 1002*a* and linear antenna array 1002*b*) to direct two or more beams in a same direction along the non-power direction (e.g., elevation direction) of the cylindrical lens 1008, resulting in a superposition of elevation beams.

Figure 11:
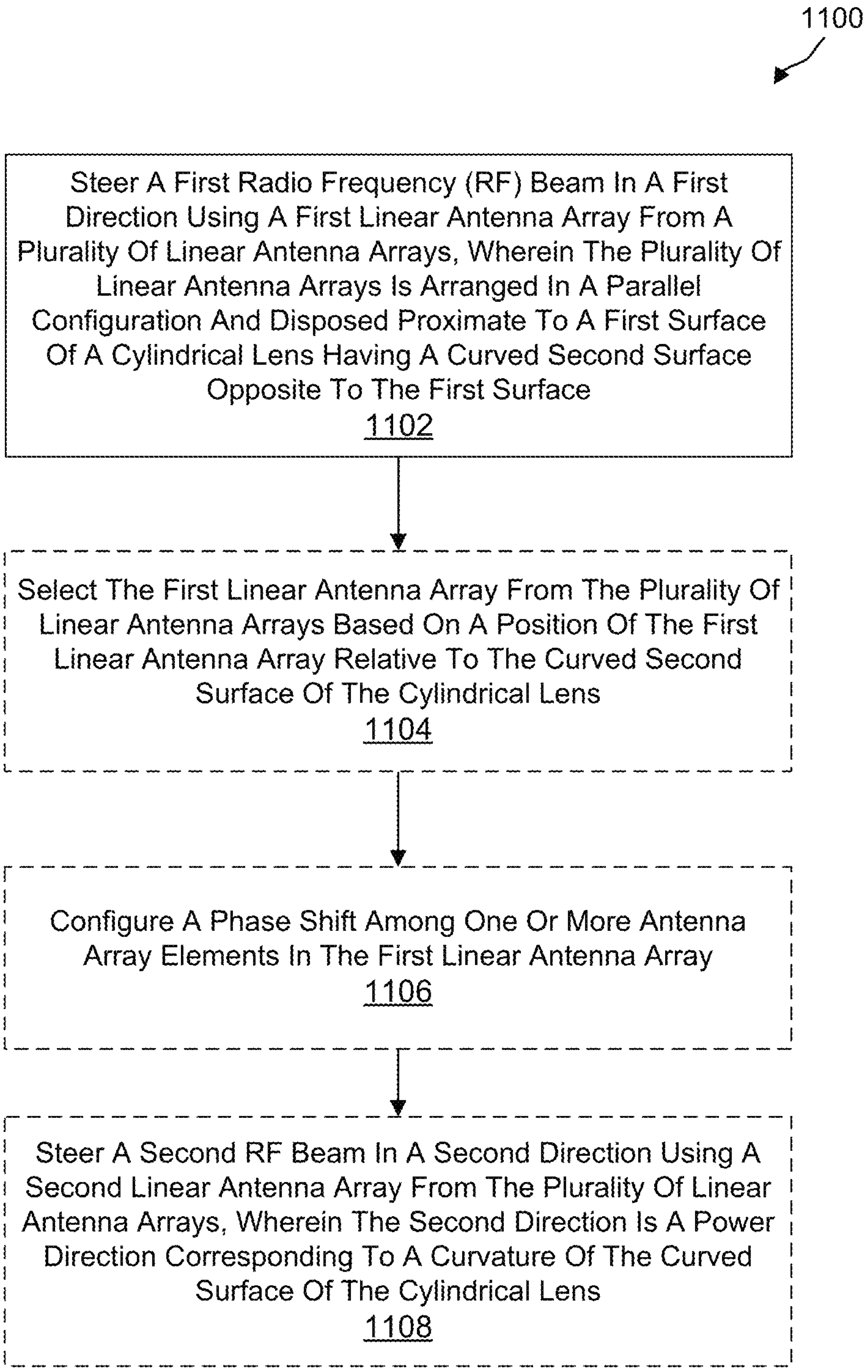
FIG. 11 is a flow diagram illustrating an example of a process for performing radio frequency beamforming, in accordance with some examples.

FIG. 11 is a flow diagram illustrating an example of a process 1100 for performing wireless communications. In some aspects, the process 1100 may be performed by, for example, a user equipment (UE) such as UE 104. Dashed boxes in FIG. 11 may indicate optional steps.

At block 1102, the process 1100 includes the UE steering (e.g., directing, positioning, etc.) a first radio frequency beam in a first direction using a first linear antenna array from a plurality of linear antenna arrays. For example, UE 104 may include linear antenna array 608, linear antenna array 612, and linear antenna array 616. In some cases, UE 104 may steer an RF beam along power direction 620 by performing array selection beamforming (e.g., selecting a linear antenna array based on its position relative to cylindrical lens 602). In some aspects, UE 104 may steer an RF beam along non-power direction 622 by performing phased array beamforming (e.g., configuring antenna elements in a linear antenna array to transmit or receive a phase shifted signal).

In some examples, the plurality of linear antenna arrays can be arranged in a parallel configuration and disposed proximate to a first surface of a cylindrical lens having a curved second surface opposite the first surface. In some configurations, the first surface can correspond to a planar surface and the curved surface can correspond to a convex surface. For instance, linear antenna array 608, linear antenna array 612, and linear antenna array 616 can be arranged in a parallel configuration (e.g., antenna elements 610, antenna elements 614, and antenna elements 618 are each aligned in directions that are parallel to each other). In some aspects, linear antenna array 608, linear antenna array 612, and linear antenna array 616 can be disposed (arranged, placed, positioned) near a first surface that is a planar surface (e.g., planar surface 508). In some cases, the planar surface may be opposite to a convex surface (e.g., curved surface 506).

In some examples, the first direction can be a power direction corresponding to a curvature of the curved surface of the cylindrical lens. For instance, the first direction can be power direction 504 that corresponds to (e.g., is alongside) a curvature of curved surface 506.

At block 1104, the process 1100 can include selecting, by the UE, the first linear antenna array from the plurality of linear antenna arrays based on a position of the first linear antenna array relative to the curved second surface of the cylindrical lens in order to steer the first RF beam in the power direction. For example, UE 800 can select linear antenna array 804*a*, linear antenna array 804*b*, or linear antenna array 804*c* based on a position of the respective linear antenna array relative to the curved surface of cylindrical lens 802. In some aspects, UE 800 can select linear antenna array 804*a* in order to steer an RF beam in the direction of RF beam 806*a*. In some examples, UE 800 can select linear antenna array 804*b* in order to steer an RF beam in the direction of RF beam 806*b*. In some instances, UE 800 can select linear antenna array 804*c* in order to steer an RF beam in the direction of RF beam 806*c*.

In some examples, the first direction can be a non-power direction that is perpendicular to a width dimension associated with a curvature of the curved second surface. For example, the first direction can correspond to non-power direction 502 that is perpendicular to a width dimension associated with curved surface 506 (e.g., non-power direction 502 is perpendicular to power direction 504).

At block 1106, the process 1100 can include, configuring, by the UE, a phase shift among one or more antenna array elements in the first linear antenna array in order to steer the RF beam in the non-power direction. For example, UE 700 can configure a phase shift among antenna elements 706*a-h* in linear antenna array 704 in order to steer an RF beam along non-power direction 712. In some aspects, a phase shift can be configured to steer an RF beam in directions corresponding to RF beam 710*a*, RF beam 710*b*, RF beam 710*c*, RF beam 710*d*, and/or RF beam 710*e*.

At block 1108, the process 1100 can include, steering, by the UE, a second RF beam in a second direction using a second linear antenna array from the plurality of linear antenna arrays, wherein the second direction is a power direction corresponding to a curvature of the curved second surface of the cylindrical lens. For example, UE 800 may select a second linear antenna array (e.g., linear antenna array 804*c*) to steer an RF beam in the direction of RF beam 806*c* along power direction 810.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

In some examples, the processes described herein (e.g., process 1100 and/or other process described herein) may be performed by a computing device or apparatus (e.g., a UE or a base station). In one example, the process 1100 can be performed by the user equipment 104 of FIG. 2 and/or the wireless device 407 of FIG. 4. In another example, the process 1100 may be performed by a computing device with the computing system 1200 shown in FIG. 12.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, neural processing units (NPUs), graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1100 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1100 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
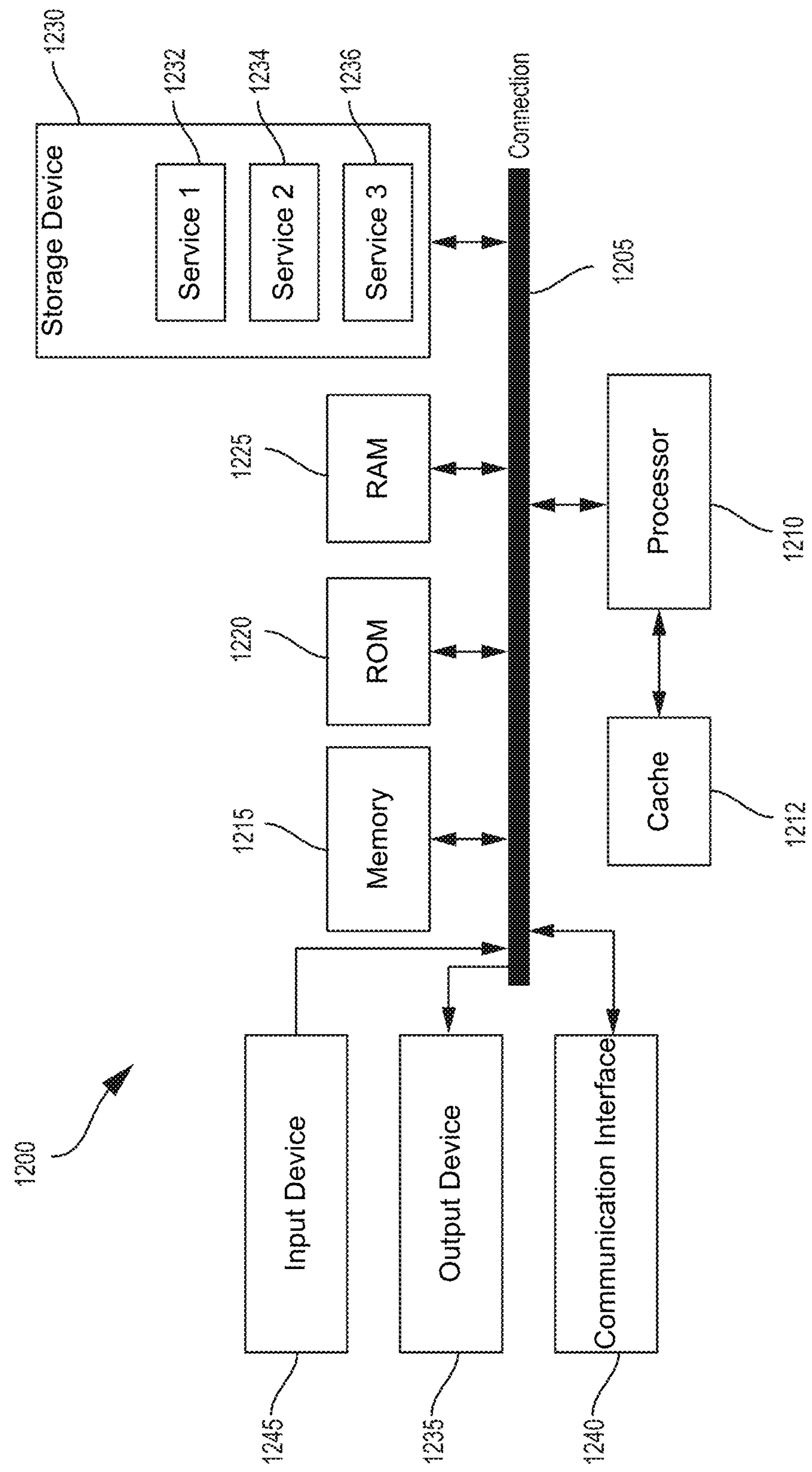
FIG. 12 is a block diagram illustrating an example of a computing system, in accordance with some examples.

FIG. 12 is a diagram illustrating an example of a system for implementing certain aspects of the present technology. In particular, FIG. 12 illustrates an example of computing system 1200, which may be for example any computing device making up internal computing system, a remote computing system, a camera, or any component thereof in which the components of the system are in communication with each other using connection 1205. Connection 1205 may be a physical connection using a bus, or a direct connection into processor 1210, such as in a chipset architecture. Connection 1205 may also be a virtual connection, networked connection, or logical connection.

In some embodiments, computing system 1200 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1200 includes at least one processing unit (CPU or processor) 1210 and connection 1205 that communicatively couples various system components including system memory 1215, such as read-only memory (ROM) 1220 and random access memory (RAM) 1225 to processor 1210. Computing system 1200 may include a cache 1212 of high-speed memory connected directly with, in close proximity to, or integrated as part of processor 1210.

Processor 1210 may include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which may represent any number of input mechanisms, such as a microphone for speech, a touch-sensitive screen for gesture or graphical input, keyboard, mouse, motion input, speech, etc. Computing system 1200 may also include output device 1235, which may be one or more of a number of output mechanisms. In some instances, multimodal systems may enable a user to provide multiple types of input/output to communicate with computing system 1200.

Computing system 1200 may include communications interface 1240, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON' wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1230 may include software services, servers, services, etc., that when the code that defines such software is executed by the processor 1210, it causes the system to perform a function. In some embodiments, a hardware service that performs a particular function may include the software component stored in a computer-readable medium in connection with the necessary hardware components, such as processor 1210, connection 1205, output device 1235, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. A wireless communication apparatus, comprising: a cylindrical lens having a first surface and a second surface opposite to the first surface, the cylindrical lens including a power direction corresponding to a curvature of the first surface and a non-power direction that is orthogonal to the power direction; and a plurality of linear antenna arrays disposed proximate to the second surface of the cylindrical lens, wherein each linear antenna array of the plurality of linear antenna arrays includes a plurality of antenna array elements.

Aspect 2. The wireless communication apparatus of Aspect 1, wherein the first surface corresponds to a planar surface and the second surface corresponds to a convex surface.

Aspect 3. The wireless communication apparatus of any of Aspects 1 to 2, wherein the plurality of antenna array elements for each of the plurality of linear antenna arrays are aligned in a direction that is perpendicular to the power direction.

Aspect 4. The wireless communication apparatus of any of Aspects 1 to 3, wherein each linear antenna array of the plurality of linear antenna arrays is associated with a corresponding beam angle based on a position of each linear antenna array relative to the second surface of the cylindrical lens.

Aspect 5. The wireless communication apparatus of any of Aspects 1 to 4, wherein each linear antenna array of the plurality of linear antenna arrays is configured to steer at least one radio frequency (RF) beam along the non-power direction of the cylindrical lens.

Aspect 6. The wireless communication apparatus of any of Aspects 1 to 5, wherein a distance between the plurality of linear antenna arrays and the first surface of the cylindrical lens corresponds to a back focal length of the cylindrical lens.

Aspect 7. The wireless communication apparatus of any of Aspects 1 to 6, wherein a distance between each antenna array element of the plurality of antenna array elements is based on a wavelength of a radio frequency signal.

Aspect 8. The wireless communication apparatus of any of Aspects 1 to 7, wherein a width dimension associated with the curvature of the first surface is less than or equal to a thickness of the wireless communication apparatus.

Aspect 9. The wireless communication apparatus of any of Aspects 1 to 8, wherein the plurality of linear antenna arrays is configured to operate in a sub-terahertz frequency range.

Aspect 10. The wireless communication apparatus of any of Aspects 1 to 9, wherein the wireless communication apparatus is configured as a user equipment (UE).

Aspect 11. The wireless communication apparatus of any of Aspects 1 to 10, further comprising: control circuitry coupled to the plurality of linear antenna arrays, wherein each of the plurality of linear antenna arrays is coupled to the control circuitry via a separate array connection, and wherein each of the plurality of linear antenna arrays is controllable independent of each other linear antenna array of the plurality of linear antenna arrays.

Aspect 12: A method of wireless communications, comprising: steering a first radio frequency (RF) beam in a first direction using a first linear antenna array from a plurality of linear antenna arrays, wherein the plurality of linear antenna arrays is arranged in a parallel configuration and disposed proximate to a first surface of a cylindrical lens having a curved second surface opposite to the first surface.

Aspect 13. The method of Aspect 12, wherein the first surface corresponds to a planar surface and the curved second surface corresponds to a convex surface.

Aspect 14. The method of any of Aspects 12 to 13, wherein the first direction is a power direction corresponding to a curvature of the curved second surface of the cylindrical lens.

Aspect 15. The method of Aspect 14, wherein steering the first RF beam in the power direction further comprises: selecting the first linear antenna array from the plurality of linear antenna arrays based on a position of the first linear antenna array relative to the curved second surface of the cylindrical lens.

Aspect 16. The method of any of Aspects 12 to 13, wherein the first direction is a non-power direction that is perpendicular to a width dimension associated with a curvature of the curved second surface.

Aspect 17. The method of Aspect 16, wherein steering the first RF beam in the non-power direction further comprises: configuring a phase shift among one or more antenna array elements in the first linear antenna array.

Aspect 18. The method of any of Aspects 12 to 17, further comprising: steering a second RF beam in a second direction using a second linear antenna array from the plurality of linear antenna arrays, wherein the second direction is a power direction corresponding to a curvature of the curved second surface of the cylindrical lens.

Aspect 19. The method of any of Aspects 12 to 18, wherein the first RF beam is configured to transmit or receive a radio frequency signal within a sub-terahertz frequency range.

Aspect 20. An apparatus for wireless communications, comprising: at least one memory; and at least one processor coupled to the at least one memory, wherein the at least one processor is configured to perform operations in accordance with any one of Aspects 12-18.

Aspect 21. An apparatus for wireless communications, comprising means for performing operations in accordance with any one of Aspects 12 to 18.

Aspect 22: A non-transitory computer-readable medium comprising instructions that, when executed by an apparatus, cause the apparatus to perform operations in accordance with any one of Aspects 12 to 18.

What is claimed is:

1. A wireless communication apparatus, comprising:

a cylindrical lens having a first surface and a second surface opposite to the first surface, the cylindrical lens including a power direction corresponding to a curvature of the second surface and a non-power direction that is orthogonal to the power direction; and a plurality of linear antenna arrays arranged in a parallel configuration proximate to the first surface of the cylindrical lens, wherein each linear antenna array of the plurality of linear antenna arrays includes a respective plurality of antenna array elements and is associated with a corresponding beam angle based on a respective position of each linear antenna array in the parallel configuration relative to the curvature of the second surface of the cylindrical lens.

2. The wireless communication apparatus of claim 1, wherein the first surface corresponds to a planar surface and the second surface corresponds to a convex surface.

3. The wireless communication apparatus of claim 1, wherein the respective plurality of antenna array elements for each of the plurality of linear antenna arrays are aligned in a direction that is perpendicular to the power direction.

4. The wireless communication apparatus of claim 1, wherein each linear antenna array of the plurality of linear antenna arrays is configured to steer at least one radio frequency (RF) beam along the non-power direction of the cylindrical lens.

5. The wireless communication apparatus of claim 1, wherein a distance between the plurality of linear antenna arrays and the first surface of the cylindrical lens corresponds to a back focal length of the cylindrical lens.

6. The wireless communication apparatus of claim 1, wherein a distance between each antenna array element of the plurality of antenna array elements is based on a wavelength of a radio frequency signal.

7. The wireless communication apparatus of claim 1, wherein a width dimension associated with the curvature of the second surface is less than or equal to a thickness of the wireless communication apparatus.

8. The wireless communication apparatus of claim 1, wherein the plurality of linear antenna arrays is configured to operate in a sub-terahertz frequency range.

9. The wireless communication apparatus of claim 1, wherein the wireless communication apparatus is configured as a user equipment (UE).

10. The wireless communication apparatus of claim 1, further comprising:

control circuitry coupled to the plurality of linear antenna arrays, wherein each of the plurality of linear antenna arrays is coupled to the control circuitry via a separate array connection, and wherein each of the plurality of linear antenna arrays is controllable independently of each other linear antenna array of the plurality of linear antenna arrays.

11. A method of wireless communications, comprising:

steering a first radio frequency (RF) beam in a first direction using a first linear antenna array from a plurality of linear antenna arrays, wherein the plurality of linear antenna arrays is arranged in a parallel configuration and disposed proximate to a first surface of a cylindrical lens having a curved second surface opposite to the first surface, and wherein each linear antenna array of the plurality of linear antenna arrays is associated with a corresponding beam angle based on a respective position of each linear antenna array in the parallel configuration relative to the curved second surface of the cylindrical lens.

12. The method of claim 11, wherein the first surface corresponds to a planar surface and the curved second surface corresponds to a convex surface.

13. The method of claim 11, wherein the first direction is a power direction corresponding to a curvature of the curved second surface of the cylindrical lens.

14. The method of claim 13, wherein steering the first RF beam in the power direction further comprises:

selecting the first linear antenna array from the plurality of linear antenna arrays based on a position of the first linear antenna array relative to the curved second surface of the cylindrical lens.

15. The method of claim 11, wherein the first direction is a non-power direction that is perpendicular to a width dimension associated with a curvature of the curved second surface.

16. The method of claim 15, wherein steering the first RF beam in the non-power direction further comprises:

configuring a phase shift among one or more antenna array elements in the first linear antenna array.

17. The method of claim 11, further comprising:

steering a second RF beam in a second direction using a second linear antenna array from the plurality of linear antenna arrays, wherein the second direction is a power direction corresponding to a curvature of the curved second surface of the cylindrical lens.

18. The method of claim 11, wherein the first RF beam is configured to transmit or receive a radio frequency signal within a sub-terahertz frequency range.

19. An apparatus for wireless communications, comprising:

at least one memory comprising instructions; and at least one processor configured to execute the instructions and cause the apparatus to:

steer a first radio frequency (RF) beam in a first direction using a first linear antenna array from a plurality of linear antenna arrays, wherein the plurality of linear antenna arrays is arranged in a parallel configuration and disposed proximate to a first surface of a cylindrical lens having a curved second surface opposite to the first surface, and wherein each linear antenna array of the plurality of linear antenna arrays is associated with a corresponding beam angle based on a respective position of each linear antenna array in the parallel configuration relative to the curved second surface of the cylindrical lens.

20. The apparatus of claim 19, wherein the first surface corresponds to a planar surface and the curved second surface corresponds to a convex surface.

21. The apparatus of claim 19, wherein the first direction is a power direction corresponding to a curvature of the curved second surface of the cylindrical lens.

22. The apparatus of claim 21, wherein to steer the first RF beam in the power direction the at least one processor is further configured to cause the apparatus to:

select the first linear antenna array from the plurality of linear antenna arrays based on a position of the first linear antenna array relative to the curved second surface of the cylindrical lens.

23. The apparatus of claim 19, wherein the first direction is a non-power direction that is perpendicular to a width dimension associated with a curvature of the curved second surface.

24. The apparatus of claim 23, wherein to steer the first RF beam in the non-power direction the at least one processor is further configured to cause the apparatus to:

configure a phase shift among one or more antenna array elements in the first linear antenna array.

25. The apparatus of claim 19, wherein the at least one processor is further configured to cause the apparatus to:

steer a second RF beam in a second direction using a second linear antenna array from the plurality of linear antenna arrays, wherein the second direction is a power direction corresponding to a curvature of the curved second surface of the cylindrical lens.

26. The apparatus of claim 19, wherein a plurality of antenna array elements of the first linear antenna array is aligned in a direction that is perpendicular to the first direction.

27. A non-transitory computer-readable medium comprising at least one instruction for causing a computer or processor to:

steer a radio frequency (RF) beam in a first direction using a first linear antenna array from a plurality of linear antenna arrays, wherein the plurality of linear antenna arrays is arranged in a parallel configuration and disposed proximate to a first surface of a cylindrical lens having a curved second surface opposite to the first surface, and wherein each linear antenna array of the plurality of linear antenna arrays is associated with a corresponding beam angle based on a respective position of each linear antenna array in the parallel configuration relative to the curved second surface of the cylindrical lens.

28. The non-transitory computer-readable medium of claim 27, wherein the first surface corresponds to a planar surface and the curved second surface corresponds to a convex surface.

29. The non-transitory computer-readable medium of claim 27, wherein the first direction is a power direction corresponding to a curvature of the curved second surface of the cylindrical lens.

30. The non-transitory computer-readable medium of claim 29, wherein to steer the RF beam in the power direction the non-transitory computer-readable medium further comprises at least one instruction for causing the computer or processor to:

select the first linear antenna array from the plurality of linear antenna arrays based on a position of the first linear antenna array relative to the curved second surface of the cylindrical lens.

* * * * *